United States Patent
Lee

(10) Patent No.: US 9,427,863 B2
(45) Date of Patent: Aug. 30, 2016

(54) ROBOT CLEANER AND METHOD OF CARING FOR HUMAN USING THE SAME

(71) Applicant: LG ELECTRONICS INC., Seoul (KR)

(72) Inventor: Haesoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/598,084

(22) Filed: Jan. 15, 2015

(65) Prior Publication Data

US 2015/0202771 A1 Jul. 23, 2015

(30) Foreign Application Priority Data

Jan. 17, 2014 (KR) .................. 10-2014-0006234

(51) Int. Cl.
| | | |
|---|---|---|
| *B25J 13/00* | (2006.01) | |
| *B25J 9/00* | (2006.01) | |
| *A47L 7/00* | (2006.01) | |
| *G05D 1/02* | (2006.01) | |
| *G08B 21/04* | (2006.01) | |

(52) U.S. Cl.
CPC ............ *B25J 9/0003* (2013.01); *A47L 7/0085* (2013.01); *G05D 1/0212* (2013.01); *G05D 1/0251* (2013.01); *G05D 1/0255* (2013.01); *A47L 2201/04* (2013.01); *G05D 2201/0215* (2013.01); *G08B 21/0476* (2013.01); *Y10S 901/01* (2013.01); *Y10S 901/47* (2013.01)

(58) Field of Classification Search
CPC .. B25J 9/0003; Y10S 901/01; Y10S 901/47; A47L 2201/04; A47L 2201/00; G05D 2201/0215
USPC .............. 700/259, 245, 255, 258; 901/1, 47; 134/18; 318/568.11, 568.12, 568.16
See application file for complete search history.

(56) References Cited

U.S. PATENT DOCUMENTS

| | | | |
|---|---|---|---|
| 8,583,282 B2* | 11/2013 | Angle ...................... | B25J 5/007 |
| | | | 700/245 |
| 2004/0093650 A1* | 5/2004 | Martins .................... | B25J 5/007 |
| | | | 180/167 |
| 2005/0216124 A1* | 9/2005 | Suzuki ................... | G05D 1/027 |
| | | | 700/253 |
| 2005/0216126 A1* | 9/2005 | Koselka ................... | B25J 5/007 |
| | | | 700/259 |
| 2006/0064203 A1 | 3/2006 | Goto et al. | |
| 2013/0056032 A1 | 3/2013 | Choe et al. | |
| 2013/0342652 A1 | 12/2013 | Kikkeri et al. | |
| 2014/0324271 A1* | 10/2014 | Oh ........................ | G05D 1/0246 |
| | | | 701/28 |

FOREIGN PATENT DOCUMENTS

WO    2013/085085 A1    6/2013

OTHER PUBLICATIONS

Anonymous: "Service robot—Wikipedia, the free encyclopedia", XP055211028, Dec. 30, 2013, pp. 1-3. Retrieved from internet: URL:https://en.wikipedia.org/w/index.php?title=Service_robot&oldid=588330499, retrieved on Sep. 3, 2015.

* cited by examiner

*Primary Examiner* — Dalena Tran

(74) *Attorney, Agent, or Firm* — Dentons US LLP

(57) ABSTRACT

A robot cleaner and a method of performing a human care using the same. Specifically, the robot cleaner can include a main body with a cleaning module, a driving unit to move the main body, one or more cameras to generate image information on a management object, a communication unit to communicate with an external communication device and transmit the image information to the external communication device, and a control unit to recognize the management object and control the robot cleaner such that the management object is included in the image information while following a position change of the management object.

21 Claims, 6 Drawing Sheets

ROBOT CLEANER AND METHOD OF CARING FOR HUMAN USING THE SAME

This application claims the benefit of the Korean Patent Application No. 10-2014-0006234, filed on Jan. 17, 2014, which is hereby incorporated by reference as if fully set forth herein.

BACKGROUND

1. Field

The present disclosure relates to a robot cleaner and a method of caring for a human using the same, and more particularly, to a robot cleaner following a specific management object and transmitting information on whether the management object is safe to an external communication device in a manner of generating an image with the information and a method of caring for a human using the robot cleaner.

2. Discussion of the Related Art

Generally, a robot cleaner drives itself autonomously in an area to be cleaned and is capable of collecting foreign substances such as dust and the like from a floor surface. Specially, a robot cleaner is an autonomous device for cleaning an indicated area.

The robot cleaner can perform a cleaning via a cleaning path predetermined by a program contained in the robot cleaner or by autonomous driving. In order for the robot cleaner to perform a cleaning operation while driving the predetermined path, a large number of sensors are used to detect a position of the robot cleaner, a driving distance, an obstacle, and the like.

An autonomous cleaning function of the robot cleaner is very helpful especially for a user experiencing mobility problems who is unable to perform cleaning by themself. For example, modern medical technology has extended many elder's life and the number of seniors who live alone due to the independence of children is increasing, the robot cleaner may become a very useful appliance for the seniors.

As, the number of seniors who live alone is increasing a guardian who is eager to check whether an elder person to which an extra health precautions should be given is safe in real time is likewise increasing.

Many of the seniors are isolated due to the lack of communication. Hence, a method enabling an elder person or a child, who may be unable to use a mobile phone, to communicate with an external contact has been seamlessly performed.

SUMMARY

Accordingly, the present disclosure is directed to an apparatus and method thereof that substantially obviates one or more problems due to limitations and disadvantages of the related art.

One object is to provide a robot cleaner and a method of caring for a human using the robot cleaner.

Another object is to provide a robot cleaner capable of caring for and managing a user as well as clean according to one embodiment of the present invention.

Another object is to provide a robot cleaner capable of following a specific management object at regular intervals according to one embodiment of the present invention.

Another object is to provide a robot cleaner capable of setting a user who is needed to be managed in advance, autonomously detecting a position of the user and following the user according to one embodiment of the present invention.

Another object is to provide a robot cleaner capable of generating and transmitting image information enabling a user using an external communication device to recognize various events occurred to a management object according to one embodiment of the present invention.

Another object is to provide a robot cleaner capable of checking a safety situation of a management object requiring real time management such as an elder person who lives alone according to one embodiment of the present invention.

Another object is to provide a robot cleaner capable of providing schedule management and overall living convenience of a management object according to one embodiment of the present invention.

Still another object is to provide a robot cleaner enabling more easy communication to be performed between a user using an external terminal and a management object according to one embodiment of the present invention.

Additional advantages, objects, and features will be set forth in part in the description which follows and in part will become apparent to those having ordinary skill in the art upon examination of the following or may be learned from practice of the invention. The objectives and other advantages may be realized and attained by the structure particularly pointed out in the written description and claims hereof as well as the appended drawings.

To achieve these objects and other advantages and in accordance with the purpose of the invention, as embodied and broadly described herein, according to one embodiment of the present invention, a robot cleaner can include a main body with a cleaning module, a driving unit to move the main body, one or more cameras to generate image information on a management object, a communication unit to communicate with an external communication device and to transmit the image information to the external communication device and a control unit to recognize the management object and control the robot cleaner such that the management object is maintained in the image information while following a position change of the management object.

The control unit can recognize a management object via various information. The control unit can recognize and specify a management object. The control unit can recognize a management object via at least one selected from the group consisting of image information, audio information, a specific command, and a signal. This sort of information may correspond to information representing a unique characteristic of the management object and may correspond to a specific signal generated in a position practically identical to the management object. For example, the information may correspond to a specific signal generated by a signal generating means attached to the management object or possessed by the management object.

Hence, the management object can be recognized and specified using information received or inputted. Furthermore, the management object can be recognized and specified via the information by utilizing an algorithm, a program, or a database embedded in the robot cleaner. Moreover, the control unit controls the one or more cameras to generate image information of the recognized and specified management object. It is preferable to control driving of the driving unit to generate optimized image information.

Specifically, the one or more cameras one focus on the management object and the control unit controls the image generation unit to include a whole body of the management object in an image screen or controls the driving unit to make a distance between the main body and the management object vary. The control unit may control the image generation unit and the driving unit at the same time. This is because, if the management object moves to a different area from a specific area, it is difficult to generate optimized image information by a control of the image generation unit only. As an example, when the robot cleaner and the management object are positioned at a living room, if the management object moves to a main room, it is preferable to move the robot cleaner together with the management object.

The control unit selectively switches a mode of the robot cleaner to a normal mode performing a unique automatic cleaning function or a care mode generating the image information on the management object according to an external input signal and obtains location information on the management object when switching to the care mode. The external input signal may correspond to a signal received via an external terminal and the like. Of course, the external input signal can be inputted via an input means included in the robot cleaner.

In the normal mode, the robot cleaner can clean a cleaning area while automatically driving the cleaning area. Of course, the robot cleaner can perform cleaning in the care mode as well. In particular, the robot cleaner can perform a unique cleaning function together with the aforementioned function of following the management object and the function of generating image information. Yet, since the care mode may preferentially perform the function of generating the image information on the management object rather than cleaning, it may be difficult to expect cleaning effect on the overall cleaning area.

If the care mode is performed, the robot cleaner preferentially searches for a management object. In particular, the robot cleaner specifies a management object. To this end, the robot cleaner automatically drives to recognize or specify a management object. Of course, the robot cleaner can drive according to a control command received from an external terminal. In this case, the robot cleaner may specify an object person to be followed via inputted or received information. In this case, the robot cleaner obtains location information of the specified management object. For example, information on a relative coordinate point at which the management object is located in response to the robot cleaner or information on an absolute coordinate point at which the management object is located within a cleaning area is obtained. By doing so, the robot cleaner recognizes the management object in a manner of moving to a point near the location information and optimized image information can be generated.

The management object can be recognized based on personal identification information such as a shape or voice of the management object stored in the storing unit. In particular, the personal identification information can be stored in a database in advance. Of course, new personal identification information can be added to the database or the personal identification information can also be modified.

Specifically, the robot cleaner further includes a microphone to detect voice and the control unit can recognize the management object by matching voice information detected by the microphone with voice information of the management object stored in advance.

If the voice information of the management object is detected by the microphone, it is preferable to obtain location information on a location in which the detected voice has occurred and moves the main body near the location in which the voice has occurred.

According to a different embodiment of the present invention, the control unit controls the robot cleaner to specify the management object based on a management object specific command signal received from the external communication device and controls the robot cleaner to follow the specified management object. For example, a user of the external communication device can specify a management object based on received image information. For instance, when a management object is displayed on the received image information, if the management object is selected, the specific command signal may occur. The robot cleaner may specify the selected management object by receiving the specific command signal.

According to a further embodiment of the present invention, the robot cleaner can further include a receiver configured to receive a signal from a following guidance system generating the specific signal while being carried by the management object. The following guidance system may be in a portable form.

In this case, the control unit can recognize an object on which the following guidance system is attached as the management object based on the signal detected by the receiver.

If the signal is received by the receiver, the control unit can switch the mode of the robot cleaner from the normal mode performing the automatic cleaning function to the care mode generating the image information on the management object.

Meanwhile, if a text message is received from an external terminal, the control unit can output an audio data corresponding to the text message. Similarly, if voice information of the management object is recognized, the control unit can transmit a text message corresponding to the voice information to an external terminal.

Moreover, the control unit can output schedule information received from the external communication device or living information by audio.

If living essential audio data is stored in the storing unit in advance such as sound of a footstep, shower sound, or the like of the management object, and the same is not detected for more than a prescribed time, it is preferable for the control unit to transmit an abnormal signal to the external communication device.

It is preferable to perform the functions related to the text message, the schedule information, and the abnormal signal in the care mode. This is because, if the management object is very far from the robot cleaner, it is difficult to smoothly deliver performance of the functions to the management object. As mentioned in the foregoing description, in the care mode, the robot cleaner and the management object are positioned within a prescribed range to generate optimized image information. Hence, performance of the functions can be smoothly and efficiently performed.

According to another embodiment of the present invention, a method of performing a human care using a robot cleaner can include the steps of specifying, by a controller, a management object to be monitored by the robot cleaner and obtaining location information of the management object, recognizing, by the controller, the management object by moving the robot cleaner to a point near the location information, generating, by the controller, image information on the management object while following the management object, and if an external communication device requests transmission of the image information, transmitting, by the controller, the image information to the external communication device.

In this case, the step of obtaining the location information can include the step of recognizing the management object. In particular, the management object can be recognized by obtaining the location information. Yet, in order to start generation of image information on the management object after the location information is obtained, the robot cleaner should move near the management object. Hence, the step of moving the robot cleaner may correspond to the step of recognizing the management object.

The method may further include the step of selectively switching, by the controller, a mode of the robot cleaner to a normal mode performing an automatic cleaning function or a care mode generating the image information on the management object based on an external input signal.

The management object can be recognized based on information, which is stored in the storing unit of the robot cleaner, capable of identifying the management object.

Specifically, in order to specify and recognize the management object, the method can further include the steps of detecting, by the controller, voice of the management object using a microphone included in the robot cleaner, determining, by the controller, a direction and a distance of a location in which the voice detected by the control unit of the robot cleaner has occurred, and moving, by the controller, the robot cleaner based on the measured direction and the distance.

According to a different embodiment of the present invention, in order to identify a location of the specified management object, the method can further include the steps of moving, by the controller, the robot cleaner based on the measured direction and the distance, obtaining, by the controller, the location information of the management object possessing the following guidance system and moving, by the controller, the robot cleaner based on the location information.

And, the location information on the management object can also be received from the external communication device. In particular, the method can further include the steps of transmitting, by the controller, the location information of the management object by the external communication device, generating, by the controller, a surrounding image while the robot cleaner moves according to the location information, transmitting, by the controller, the surrounding image to the external communication device and if the management object is included in the surrounding image, transmitting a command signal by the external communication device to make the robot cleaner recognize the management object.

Meanwhile, it is preferable for the method to further include the steps of storing, by the controller, the image information in the storing unit of the robot cleaner, requesting image information of a specific time by the external communication device, and transmitting, by the controller, the image information of the specific time according to the request of the external communication device.

And, the method can further include the steps of receiving, by the controller, a text message from the external communication device, converting, by the controller, the text message into an audio data, and outputting, by the controller, the audio data.

According to one embodiment, a robot cleaner is provided which is capable of monitoring and managing a user as well as cleaning.

According to another embodiment, a robot cleaner is provided which is capable of following a specific management object at regular intervals.

According to another embodiment, a robot cleaner is provided which is capable of setting a user who is needed to be managed in advance, autonomously detecting a position of the user and following the user.

According to another embodiment, a robot cleaner is provided which is capable of generating and transmitting image information enabling a user using an external communication device to recognize various events occurred to a management object.

According to another embodiment, a robot cleaner is provided which is capable of checking from a distance a safety situation of a management object requiring a real time management such as an elder person who lives alone.

According to another embodiment, a robot cleaner is provided which is capable of providing schedule management and overall living convenience of a management object.

According to another embodiment, a robot cleaner is provided which enables more convenient communication to be performed between a user using an external terminal and a management object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

For clarity and convenience of explanation, a size or a shape of a configuration element can be exaggeratedly depicted. And, terminologies, which are specially defined in consideration of a configuration and operation of the present invention, may vary in accordance with an intention of a user, an intention of a manager, or custom. Definition on the terminologies should be defined based on overall contents contained in the present specification.

A configuration of a robot cleaner 100 according to embodiment of the present invention is explained in detail with reference to FIG. 1 to FIG. 4 in the following.

Figure 1:
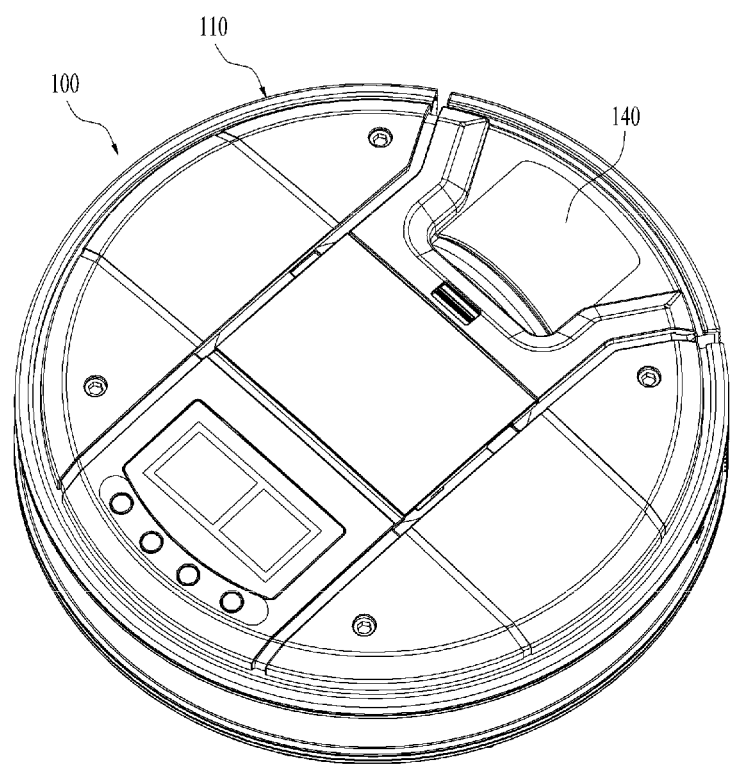
FIG. 1 is a perspective diagram for a robot cleaner according to one embodiment of the present invention.
Figure 2:
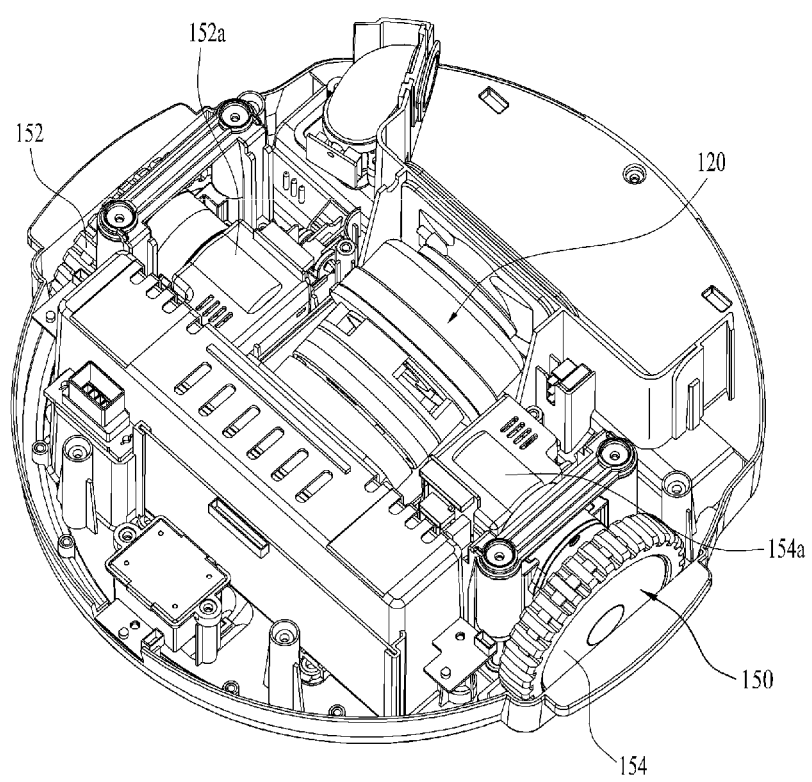
FIG. 2 is a perspective diagram for an internal configuration of a robot cleaner according to one embodiment of the present invention.

FIG. 1 is a perspective diagram for a robot cleaner 100 according to one embodiment of the present invention, FIG.

Figure 3:
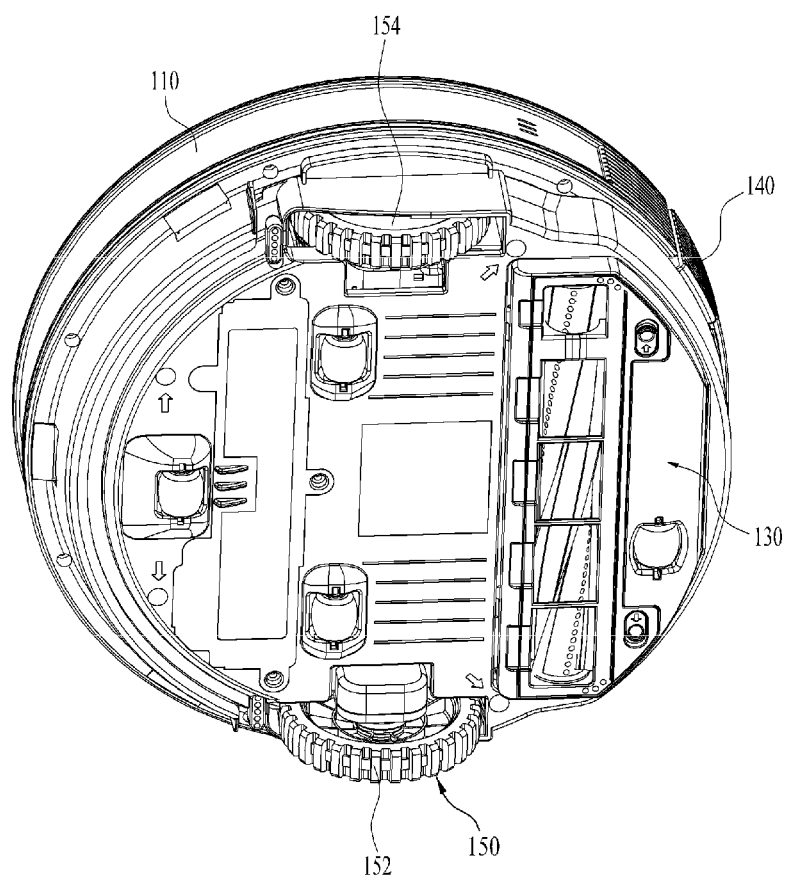
FIG. 3 is a perspective diagram for a bottom of a robot cleaner according to one embodiment of the present invention.
Figure 4:
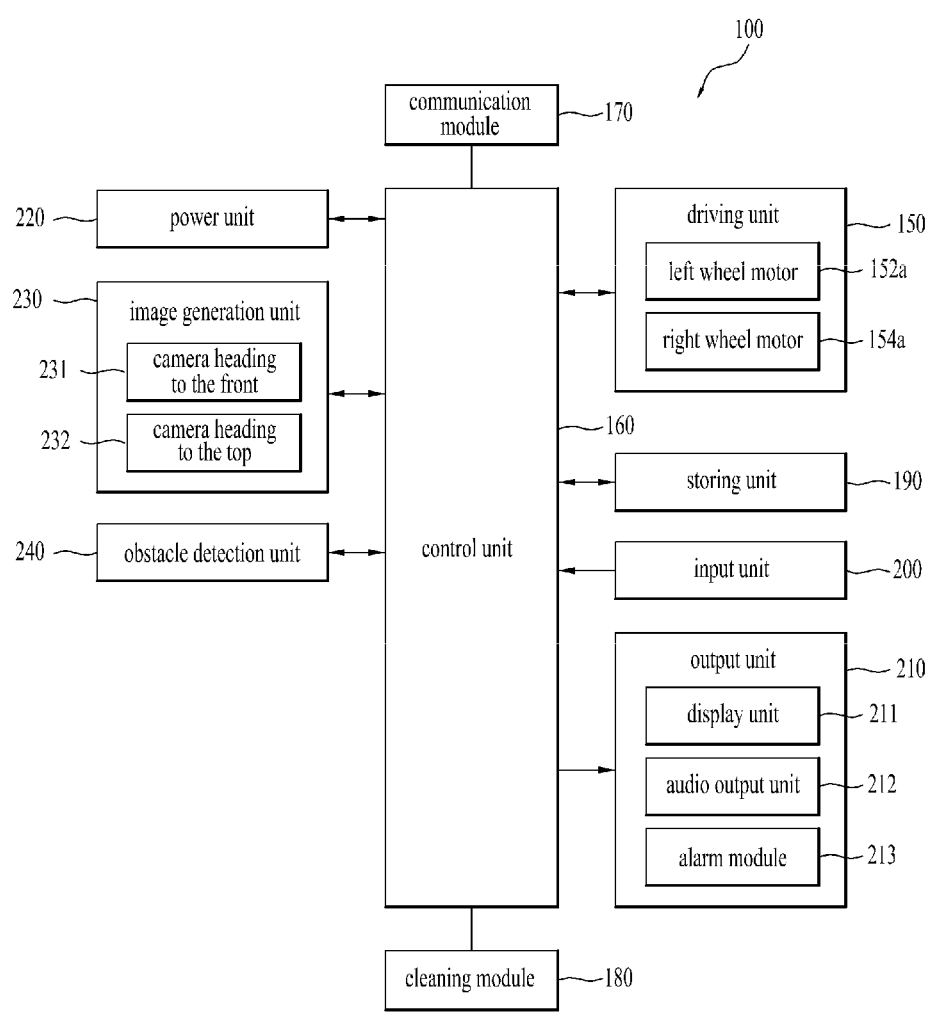
FIG. 4 is a block diagram for a robot cleaner according to one embodiment of the present invention.

2 is a perspective diagram for an internal configuration of a robot cleaner 100 according to one embodiment of the present invention, FIG. 3 is a perspective diagram for a bottom of a robot cleaner 100 according to one embodiment of the present invention, and FIG. 4 is a block diagram for a robot cleaner 100 according to one embodiment of the present invention.

In particular, FIG. 4 is a block diagram showing a robot cleaner on the basis of a control unit of the robot cleaner 100.

The robot cleaner 100 includes a cleaning module 180 to perform a cleaning function. The cleaning module 180 includes a suction device 120 installed in the inside of a main body of the robot cleaner, a suction nozzle configured to suck dust from a floor coupled to the suction device 120 and a dust collector 140 collecting foreign substance in the air sucked by the suction nozzle.

A control unit 160 controlling operations of robot cleaner 100 can be installed in the inside (e.g., a front portion) of main body 110 of robot cleaner 100 in a manner of being connected with various parts of robot cleaner 100.

And, in order to control robot cleaner 100 from an external device, a communication unit 170 capable of performing wireless communication with an external device can be mounted on the robot cleaner 100 according to the present embodiment.

The communication unit 170 transceives a signal and data with an external communication device in a manner of being connected with the external communication device using one communication scheme among currently available communication schemes including a wired, wireless, and a satellite communication scheme.

The communication unit 170 can receive a control signal from the external communication device and can transmit image information to the external communication device. The communication unit 170 can also transmit status information, obstacle information, position information, image information, a cleaning map, and the like of the robot cleaner 100.

And, the communication unit 170 can perform communication with an external communication device using a communication scheme of a short range wireless communication scheme including a radio frequency (RF) communication, Bluetooth, infrared communication (IrDA), a wireless LAN, Zigbee, and the like.

For example, if the external communication device corresponds to a smartphone, robot cleaner 100 can include a communication unit in accordance with a communication scheme available for the smartphone.

A sensor (not depicted) configured to detect a distance to an indoor wall or an obstacle and a bumper (not depicted) configured to absorb an impact of collision can be installed in an outer circumference surface of main body 110 of the robot cleaner.

And, robot cleaner 100 includes one or more wheels and further includes a driving unit 150 configured to move the main body 110 according to a driving signal. The control unit extracts a moving command from a control signal and generates a driving signal based on the moving command. The controller can move robot cleaner 100 according to a moving path.

The driving unit 150 can be installed in the main body 100 in a manner of protruding from the main body 110 to, in particular, a floor surface.

The driving unit 150 can include a left driving wheel 152 and a right driving wheel 154, which are installed in both sides of the bottom of main body 110 of the robot cleaner, respectively. The left driving wheel and the right driving wheel 152/154 are configured to rotate by a left wheel motor 152a and a right wheel motor 154a, respectively. The left wheel motor 152a and the right wheel motor 154a are controlled by control unit 160 of the robot cleaner. Robot cleaner 100 can automatically change directions according to the driving of left wheel motor 152a and right wheel motor 154a and perform cleaning operation.

Meanwhile, an image generation unit 230 configured to generate image information by capturing the robot cleaner's surroundings can be installed in the robot cleaner 100. To accomplish this, one or more cameras can be included in the image generation unit 230. A map may be made using the camera(s). Specially, a cleaning map corresponding to a cleaning area can be made using the camera.

The camera may include a camera pointed to the front 231 and a camera pointed to the top 232. For a lens of the camera, a lens of a wide angle of view can be used to capture all areas, e.g., all areas of a ceiling, in a prescribed position.

Image information generated by the camera can be transmitted to an external communication device, which shall be described later in detail.

The robot cleaner 100 is equipped with one or more sensors. The robot cleaner may further include an obstacle detection unit 240 configured to output obstacle information in a manner of detecting an obstacle situating around the robot cleaner using a signal detected by the sensor.

Meanwhile, robot cleaner 100 can further include a storing unit 190 configured to store one or more information among image information, obstacle information, position information, a cleaning map, and a cleaning area. Information capable of being used for recognizing a management object such as voice or a body shape of the management object can be stored in the storing unit 190 in advance.

Storing unit 190 stores a control program controlling (driving) the robot cleaner 100 and data according to the control program. And, storing unit 190 can store a cleaning scheme and a driving scheme. Storing unit 190 mainly uses a non-volatile memory. In this case, the non-volatile memory (NVM, NVRAM) corresponds to a storing device continuously maintaining stored information whether powered or un-powered. The volatile memory can include a ROM, a flash memory, a magnetic computer memory device (e.g., a HDD, a disc drive, a magnetic tape), an optical disc drive, a magnetic RAM, a PRAM, and the like.

Robot cleaner 100 can further include an input unit 200 directly receiving a control command input. Input unit 200 can be formed with one or more buttons. For instance, the button may include a normal mode, a care mode, a text message transmission/reception mode, a set button, and the like.

An external input signal may selectively switch a mode into the normal mode, the care mode, the text message transmission/reception mode, or the like.

The normal mode indicates a state capable of performing an automatic cleaning function, which is a unique function of the robot cleaner. A function of following a management object and a function of generating image information can be executed in the care mode. The care mode indicates a state that various sensors of the robot cleaner 100 are configured to detect a position of the management object, the driving unit configured to move the robot cleaner to the position of the management object, and the camera configured to generate image information are switched to an active state, respectively.

It is preferable to selectively switch the normal mode into the care mode according to an external input signal. This is because, when it is not necessary to care for the management object, unnecessary memory or power consumption can be minimized in a manner of maintaining the normal mode.

The external input signal may correspond to not only a signal inputted to input unit 200 by a user but also a signal transmitted from an external communication device. In this case, the external communication device may include all devices capable of communicating with the robot cleaner such as an external terminal.

More specifically, a user can execute a specific application to control robot cleaner 100 via an external communication device. In this process, it may perform a procedure of registering the robot cleaner 100 at the external communication device to control the robot cleaner.

The external communication device can transmit a command signal making robot cleaner 100 switch to the care mode from the normal mode via a communication network connected with the robot cleaner 100.

In particular, if a user of an external communication device wants to check a safety state of a management object, the user can selectively switch various modes such as the normal mode, the care mode, and the like of the robot cleaner 100 in a manner of executing an application.

The aforementioned function is designed for a management object who has problems in mobility and a difficulty in operating robot cleaner 100. And, an object of the present invention originated from an elder care can be more efficiently implemented by making a user who wants to check a safety of the management object in real time remotely control robot cleaner 100.

Meanwhile, output unit 210 displays reservation information, a battery status, a cleaning scheme such as a concentrated cleaning and the like, a driving scheme or the like on a screen. And, output unit 210 can output a current state of each of the components included in robot cleaner 100 and a current cleaning state.

Besides the display of the aforementioned information on a display unit, output unit 210 can include an audio output device 212 configured to output data received from the external communication device by voice.

For instance, when a text message is sent to the management object from the external communication, robot cleaner 100 can output the text message by audio data according to a text message recognition algorithm.

If a management object selects the text message transmission/reception mode of input unit 200, the control unit 160 can convert voice of the management object into a text message data according to a voice recognition algorithm. And, the control unit 160 can transmit the converted text message data to the external communication device.

If a person, such as a senior or a child, is not accustomed to mobile communication and may not be good at transmitting a text message using a mobile phone, this is a useful feature. Moreover, it is more difficult for a person who has problems in mobility or a person in an emergency situation to inform of a situation of the person by a text message using a mobile phone.

Hence, a message can be easily transmitted to an external communication device via robot cleaner 100 which is driving while following the person. When the person speaks a word preferred to be delivered to robot cleaner 100, which is following the person, the robot cleaner coverts the word to a text message data and transmits the text message data to a user of the external communication device. By doing so, conversation between the user of the external communication device such as an offspring or a guardian and the management object is enriched and it is able to efficiently prepare for an emergency situation of the management object.

And, in order to inform pre-stored information on a schedule of a management object, the audio output device can output the schedule by audio on a schedule. Besides, the audio output device can output schedule information received from the external communication device or living information by audio as well.

Specifically, the audio information regarding the schedule such as time to go to a hospital, time to take a medicine, time to have food, time to exercise, and the like can be inputted in storing unit 190 in advance. And, the schedule can be outputted via the audio output device at the appropriate time.

In particular, unlike a mobile terminal, since robot cleaner 100 outputs schedule occurrence information by audio while consistently following a specific management object, a user can hear a notification despite the user not carrying the device on their person.

Hence, the robot cleaner can help management objects who need a consistent management to perform all important schedules without a help of offspring or a guardian. It is preferable to provide the schedule information output function in a normal mode as well to make schedules of the management object to be informed all the time.

Meanwhile, according to a preferred embodiment of the present invention, robot cleaner 100 can move main body 110 to make an object to be managed to be included in a camera image in real time. In particular, it is preferable to make robot cleaner 100 generate image information while following a specific single user only.

The control unit 160 can make robot cleaner 100 recognize a management object to follow and move main body 110 when a position change of the management object is detected. And, the camera generates image information by focusing on the management object by the camera.

The control unit may control zoom of the camera or an angle of the camera to make a whole body of the management object to be included in an image screen of the camera. The control unit 160 of robot cleaner 100 controls the driving unit to make a distance between main body 110 and the management object vary.

It is necessary to preferentially perform a process of moving the robot cleaner 100 to a position sufficient enough to follow and start caring of a management object. In particular, a step of recognizing a specific management object recognized by the robot cleaner 100 can be preferentially performed.

The control unit can recognize the specified management object based on such personal identification information as a shape or voice of the management object stored in storing unit 190 in advance.

Specifically, robot cleaner 100 may include a microphone configured to detect the voice of the management object. The control unit 160 can recognize the management object by determining whether audio information detected by the microphone is matched with audio information of the management object stored in advance.

If the detected audio information corresponds to the audio information of the specified management object, robot cleaner 100 obtains information on a location in which the detected audio has occurred. The control unit 160 moves main body 110 near the location in which the detected audio has occurred based on the information on the location to drive the robot cleaner 100 near a location at which the management object is located.

According to a different embodiment of the present invention, if a shape of the management person is stored in the storing unit 190 in advance, it is able to recognize a specified management object by comparing the shape of the management object stored in storing unit 190 with a shape of an object detected by the camera.

According to a further embodiment of the present invention, in case that the management object carries a device generating sound of a specific wavelength, the robot cleaner 100 may include a receiver capable of receiving the sound.

The robot cleaner 100 can recognize an object on which a following guidance system is attached or an object carrying the following guidance system as a management object based on a signal detected by the receiver.

The following guidance system can be carried by the management object in a portable form. In case that the management object attaches the following guidance system on a body of the management object or carries the following guidance system, a location in which a signal of the following guidance system occurs may become a location of the management object.

According to a preferred embodiment of the present invention, the robot cleaner 100 can specify a management object based on a management object specific command signal received from an external communication device and may be then able to follow the specified management object.

In particular, the external communication device can control robot cleaner 100 to recognize a management object by transmitting location information of the management object.

More specifically, the external communication device transmits location information of a management object to the robot cleaner 100. Robot cleaner 100 can then generate a surrounding image based on the location information while moving around. The control unit 160 can transmit the surrounding image to the external communication device. The external communication device can determine the management object based on the surrounding image.

If the management object is not included in the image information, the external communication device can transmit the location information again in a manner of modifying the location information. The robot cleaner 100 then drives and generates a surrounding image based on the modified location information. Robot cleaner 100 can determine a location of the management object via the aforementioned process.

Once a management object to follow is determined, the robot cleaner 100 generates image information on the management object and starts to follow the management object. In order for the robot cleaner 100 to follow the management object, the camera captures a moving image of the management object and the control unit 160 compares the moving image with a previous moving image. In particular, if a difference between the moving image and the previous moving image is greater than a prescribed value, the control unit can recognize a movement of a target.

If the movement of the target is recognized, the control unit 160 can calculate a distance between the robot cleaner 100 and the target using an image outputted from the image generation unit 230. For example, the control unit 160 can calculate the distance between robot cleaner 100 and the target in a manner of applying trigonometry to both a left image and a right image including the target, which is captured by the image generation unit 230 including a stereo camera.

Subsequently, the control unit 160 can control the driving unit to move within a prescribed space between robot cleaner 100 and the target using the calculated distance. In particular, the control unit 160 can control robot cleaner 100 to follow the target within a prescribed distance (prescribed space).

As mentioned in the foregoing description, in case that the robot cleaner generates image information while following the management object and transmits the image information to the external communication device, the robot cleaner can provide information on a safety of the management object in real time.

In the care mode, audio data of essential living surrounds is stored in the storing unit 190 in advance sound such as of a footstep, shower sound, and the like of the management object. If these essential living sounds are not detected for more than a prescribed time, the control unit 160 can transmit an abnormal signal to the external communication device.

Occasionally, an emergency situation occurs in a manner that an unhealthy patient or the elderly suddenly falls down or may be in a state incapable of moving due to a health problem. Hence, various living noises occurring in everyday life are stored in the storing unit 190 in advance. And then, if the living noises are not detected by robot cleaner 100 for more than a prescribed time, an abnormal signal can be transmitted to a user of an external communication device.

Having received the abnormal signal, the user of the external communication device remotely switches a mode of robot cleaner 100 into the care mode and may be then able to check a safety of a management object.

As mentioned in the foregoing description, according to the present invention, an object of caring is not unspecified individuals but a specified management object recognized by the robot cleaner 100. By doing so, the robot cleaner 100 can generate image information on the management object and check whether the management object is safe. And, the robot cleaner helps the management object to smoothly perform schedule management and communication.

In addition to the embodiments described above, wherein the management objection is recognized and/or otherwise identified and then cared for (i.e., followed/monitored), it is within the scope of this disclosure to perform any of the functions identified with respect to the care mode, in the normal mode. That is, for example, the robot cleaner 100 can recognize and/or otherwise identify a management object, without having to then follow said management object. Instead, according to an embodiment, the robot cleaner can continue cleaning in the normal mode, even though the management object is identified. Furthermore, in at least one embodiment, other functions typical of the care mode, such as capturing and/or transmitting images of the management object and surroundings, reading and/or recording text/voice messages, and alerting a management object to a schedule, can all be performed in the normal mode, such that cleaning is still principally performed.

Alternatively, in one embodiment, the robot cleaner 100 can switch in and out of normal/care mode according to a number of triggers, for example, a schedule or signal from an external source, such that both goals of maintaining a clean environment and monitoring the management object may be achieved.

In particular, robot cleaner 100 can monitor everyday life of a person who has problems. such as in mobility, or an elderly who lives alone in a manner that the robot cleaner 100 stays close to said management object.

A method of performing human care using a robot cleaner according to one embodiment of the present invention is explained in detail with reference to FIG. 5 and FIG. 6 in the following.

Figure 5:
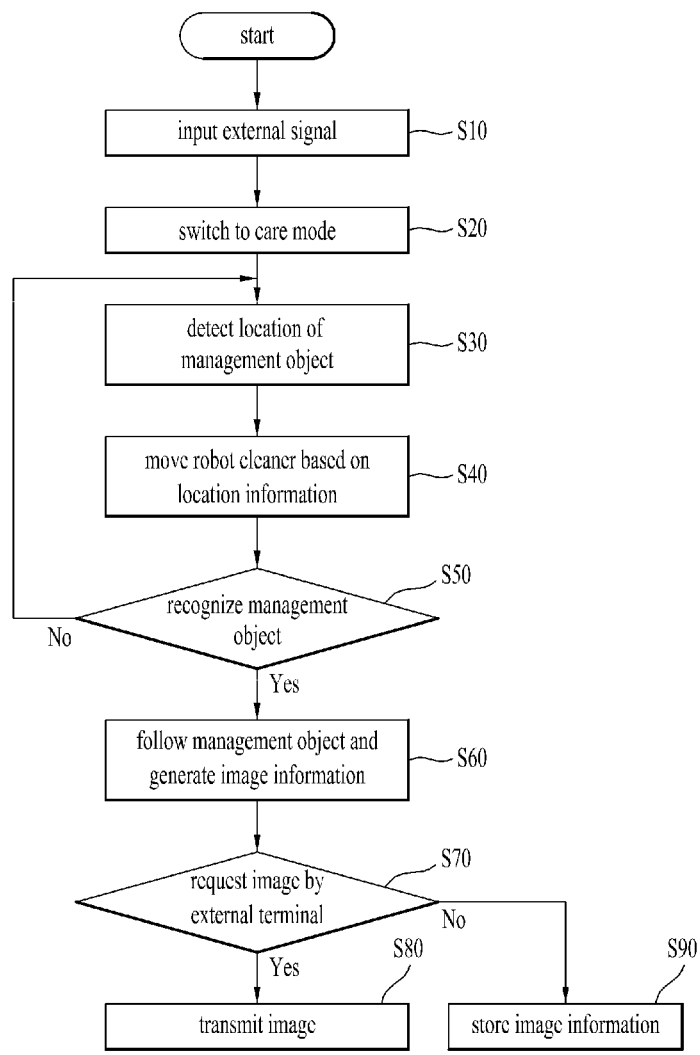
FIG. 5 is a schematic flowchart for one embodiment of a method of caring for a user using a robot cleaner according to one embodiment of the present invention.

FIG. 5 is a schematic flowchart for one embodiment of a method of caring for a user using a robot cleaner according to one embodiment of the present invention.

According to one embodiment of the present invention, if an external signal is inputted [S10], the present invention can include a step [S20] of selectively switching a mode of the robot cleaner 100 by the inputted external signal between a normal mode not generating image information on the management object and a care mode monitoring the management object in a manner of following the management object and generating image information on the management object.

The external input signal may correspond to a signal directly inputted by a button of an input unit of the robot cleaner. The external input signal may include various signals including a signal inputted from an external communication device, voice of a user, an external signal received by a receiver of the robot cleaner, and the like.

Meanwhile, the present invention may include a step of specifying a management object to be cared by the robot cleaner and a step [S30] of obtaining location information of the management object. In order for the robot cleaner 100 to follow a single management object only and generate image information on the single management object, it is necessary to specify the management object. And, the control unit 160 controls the driving unit to make the robot cleaner 100 drive [S40] to a position sufficient enough to capture the management object in a manner of obtaining the location information of the management object.

After the robot cleaner 100 has moved to the position at which the management object is located, the control unit 160 recognizes the management object [S50] and generates image information on the management object [S60].

If the external communication device makes a request for the image information, the control unit 160 can provide an image to the external communication unit in real time [S80]. If the external communication device does not request the image information, the control unit 160 still generates image information and may store the image information in the storing unit [S90].

More specifically, according to a preferred embodiment of the present invention, in order to specify and recognize the management object, it may include a step of detecting voice of the management object via a microphone included in the robot cleaner.

The voice of the management object is stored in the control unit 160 in advance. The control unit 160 can determine whether the voice detected by the microphone is matched with the voice of the management object in a manner of comparing the voice detected by the microphone with the voice stored in the control unit 160 in advance. If the voice of the management object is detected by the robot cleaner 100, it is able to perform a step of measuring a direction and a distance of a location in which the voice detected by the control unit 160 of the robot cleaner 100 has occurred. The control unit 160 can move the robot cleaner based on the measured direction and the distance.

According to a different embodiment, the step of detecting the management object may include a step of receiving a guide signal from a following guidance system generating a specific wavelength or sound capable of being detected by a receiver of the robot cleaner.

If the following guidance system generates a signal, the control unit 160 of the robot cleaner 100 can obtain location information of an object on which the following guidance system is attached. And, the control unit 160 controls the driving unit 150 to make the robot cleaner 100 move based on the location information.

Power of the following guidance system can be turned on or turned off. Hence, a guide signal of the following guidance system may become an external input signal switching a mode of the robot cleaner 100 between the normal mode and the care mode of the robot cleaner.

After the robot cleaner 100 drives to a point according to the location information, the robot cleaner 100 controls the driving unit 150 to make the robot cleaner 100 follow a movement of the management object and move according to the movement. In particular, the robot cleaner 100 follows the management object to make the management object to be included in an angle of the camera and captures the management object.

The captured image information can be transmitted to an external communication device. The captured image information can be transmitted to the external communication device in real time. Or, the captured image information can be selectively transmitted to the external communication device when the external communication device requests the image information only.

In particular, if the external communication device requests the image, the image is transmitted to the external communication device in real time. Yet, if the external communication device does not request the image, the image is stored in the storing unit of the robot cleaner.

If a user of the external communication device requests previously captured image information, the control unit 160 transmits a corresponding image stored in the storing unit of the robot cleaner 100 to the external communication device.

Figure 6:
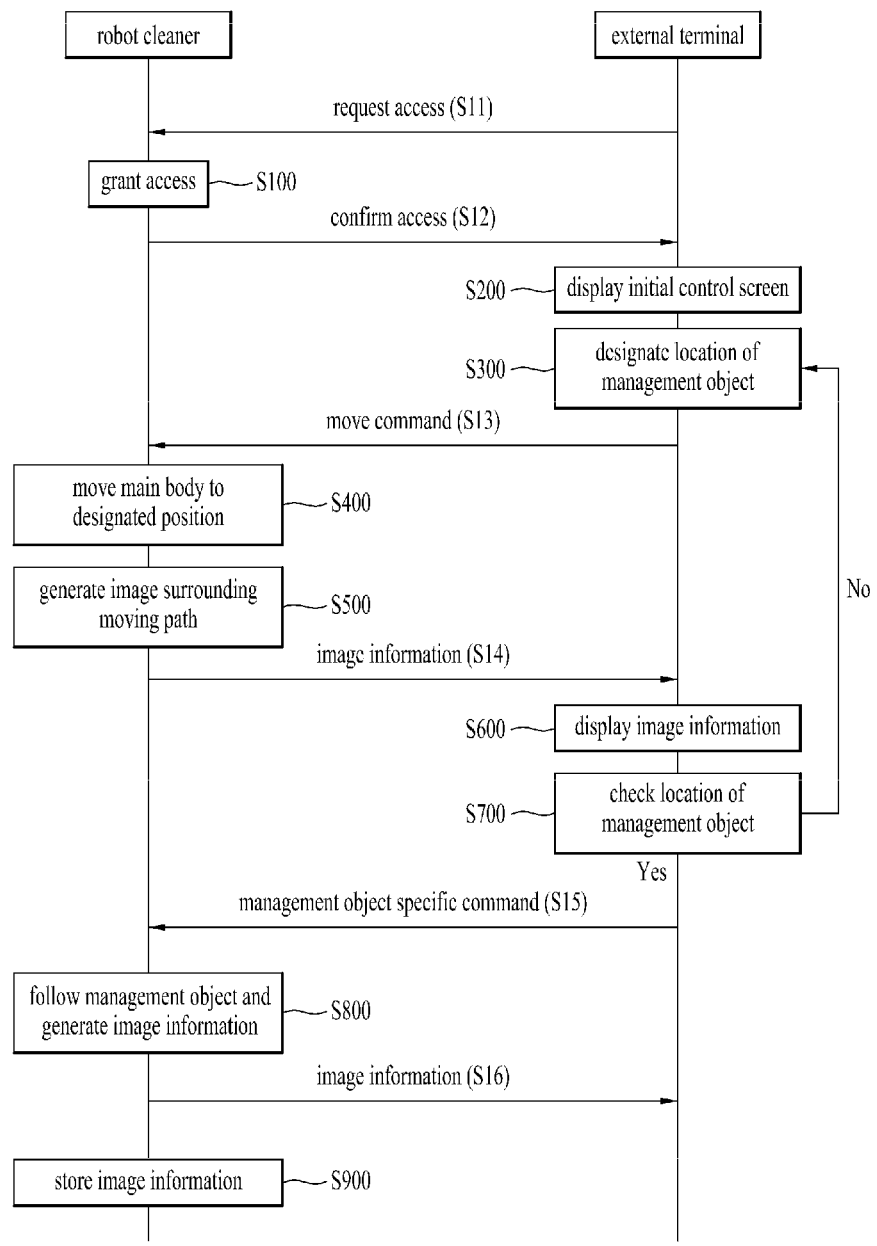
FIG. 6 is a schematic flowchart for one embodiment of recognizing a management object recognized by an external communication device in FIG. 5.

FIG. 6 is a schematic flowchart for one embodiment of detecting a position of a management object detected by an external communication device in FIG. 5.

The external communication device can make a request for accessing the robot cleaner 100 [S11]. It is necessary to preferentially perform a process of registering the external communication device at the robot cleaner 100 to remotely control the robot cleaner 100 by the external communication device.

If an access request is received from the external communication device which is registered at the robot cleaner 100, the control unit 160 of the robot cleaner 100 determines whether access of the external communication device is granted [S100]. If the grant is completed, the control unit 160 transmits an access confirmation signal to the external communication device [S12] and an initial control screen for controlling the robot cleaner 100 is displayed on the external communication device [S200].

A position of the management object is designated by the external communication device via the control screen [S300]. The external communication device transmits a move command to the control unit 160 to make the main body of the robot cleaner 100 move according to the information [S13]. Having received the control command, the control unit 160 can move the main body 110 of the robot cleaner 100 according to the location information [S400]. The robot cleaner 100 can generate a surrounding image while driving to the position according to a moving path [S500].

The robot cleaner 100 can transmit the surrounding image to the external communication device [S14]. The external communication device outputs the surrounding image

[S600] and the user of the external communication device checks whether the management object is included in a camera image using the surrounding image [S700].

If the management object is not included in the camera image, it is necessary to perform a process of setting a position of the management object again. The robot cleaner drives and generates a surrounding image again based on the modified location information and transmits the surrounding image to the external communication device again. By doing so, the user of the external terminal can determine location information of the management object and transmits the location information.

On the contrary, if the management object is included in the camera image, the user of the external communication device can determine a position of the management object. Hence, the external communication device transmits a command to the robot cleaner to make the robot cleaner specify and recognize a person situating at the position as the management object [S15].

The robot cleaner 100 recognizes the specified management object, follows the management object and generates image information [S800]. The robot cleaner 100 transmits the image information to the external terminal or stores the image information in the storing unit [S900].

As mentioned in the foregoing description, although it is hard for the management object to directly operate the robot cleaner 100, a user situating at external can determine a position of the management object by remotely controlling the robot cleaner 100.

If the position of the management object is checked and the robot cleaner 100 arrives at a distance sufficient enough to follow the management object, the robot cleaner 100 can generate image information on the management object in real time while following the management object.

Similarly, after the image information is generated, the image information is transmitted to the external communication device or is stored in the storing unit of the robot cleaner 100.

Besides the image information provided to the external communication device, various services can be provided by the robot cleaner 100. In order to make communication to be enriched with the management object who lives alone and has few chance to communicate externally, for example an elderly or a physically challenged person who has a difficulty in operating a mobile phone such as a text message service, the robot cleaner 100 can provide a communication-related service as well.

In particular, if the robot cleaner 100 receives a text message from the external communication device, the robot cleaner 100 can include a step of converting the text message into an audio data and a step of outputting the audio data.

If the management object wants to send a text message to the external communication device, the management object can input a signal to make a mode of the robot cleaner 100, which follows and captures the management object in a close position, to be a text message transmission mode. And then, the robot cleaner 100 can transmit the text data to the external communication device in a manner of passing through a step of detecting voice of the management object and a step of converting the detected voice into a text data.

Besides, the robot cleaner 100 may further include a step of outputting scheduling information stored in the storing unit of the robot cleaner by audio.

Meanwhile, although the user of the external terminal does not see the image information, it is necessary to check a safety of the management object. Hence, according to a preferred embodiment of the present invention, the robot cleaner 100 can include a step of detecting living noises generated around the management object using a microphone. If a volume of the detected living noises is less than strength of living essential audio data stored in the storing unit 190 of the robot cleaner 100 in advance, the robot cleaner 100 can further include a step of transmitting an abnormal signal to the external communication device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A robot cleaner, comprising:
a main body including a cleaning module;
a driving unit to move the main body;
one or more cameras to generate image information on a management object;
a communication unit to communicate with an external communication device and to transmit the image information to the external communication device;
a control unit to recognize the management object and control the robot cleaner such that the management object is maintained in the image information while following a position change of the management object; and
a microphone to detect a voice,
wherein the control unit is configured to selectively switch a mode of the robot cleaner to a normal mode performing an automatic cleaning function or a care mode generating the image information on the management object according to an external input signal and obtain location information on the management object in case of switching to the care mode,
wherein the management object is recognized based on such a personal identification information as a shape or voice of the management object stored in a storing unit in advance,
wherein the control unit is configured to recognize the management object in a manner of determining whether voice information detected by the microphone is matched with voice information of the management object stored in advance, and
wherein if the voice information of the management object is detected by the microphone, the control unit is configured to obtain location information on a location in which the detected voice has occurred and move the main body near the location in which the voice has occurred.

2. The robot cleaner of claim 1, wherein the one or more cameras focus on the management object and wherein the control unit controls the image generation unit to contain a whole body of the management object in an image screen or controls the driving unit to make a distance between the main body and the management object vary.

3. The robot cleaner of claim 1, wherein if the voice information of the management object is detected by the microphone, the control unit obtains location information on a location in which the detected voice has occurred and moves the main body near the location in which the voice has occurred.

4. The robot cleaner of claim 1, wherein the control unit controls the robot cleaner to specify the management object based on a management object specific command signal received from the external communication device and controls the robot cleaner to follow the specified management object.

5. The robot cleaner of claim 1, further comprising:
a receiver to receive a signal from a following guidance system generating the specific signal while being carried by the management object,
wherein the control unit recognizes an object on which the following guidance system is attached as the management object based on the signal detected by the receiver.

6. The robot cleaner of claim 5, wherein if the signal is received by the receiver, the control unit switches the mode of the robot cleaner from the normal mode to the care mode.

7. The robot cleaner of claim 1, wherein if a text message is received from an external terminal, the control unit outputs audio data corresponding to the text message.

8. The robot cleaner of claim 1, wherein if voice information of the management object is recognized, the control unit transmits a text message corresponding to the voice information to an external terminal.

9. The robot cleaner of claim 1, wherein the control unit outputs schedule information received from the external communication device or living information by audio.

10. The robot cleaner of claim 1, wherein the control unit outputs schedule information by audio based on the information on the schedule stored in a storing unit at an appropriate time corresponding to the schedule.

11. The robot cleaner of claim 1, wherein if living essential audio data stored in a storing unit as a sound of a footstep, shower sound, or the like of the management object is not detected for more than a prescribed time, the control unit transmits an abnormal signal to the external communication device.

12. A method of performing a human care using a robot cleaner, comprising the steps of:
specifying a management object to be cared by the robot cleaner and obtaining location information of the management object;
recognizing the management object in a manner that the robot cleaner moves to a point near the location information;
generating image information on the management object while following the management object by the robot cleaner; and
if an external communication device requests transmission of the image information, transmitting the image information to the external communication device,
wherein in order to obtain the location information of the management object, further comprising the steps of:
transmitting the location information of the management object by the external communication device;
generating a surrounding image while the robot cleaner moves according to the location information;
transmitting the surrounding image to the external communication device; and
if the management object is contained in the surrounding image, transmitting a command signal by the external communication device to make the robot cleaner recognize the management object.

13. The method of claim 12, further comprising:
the step of selectively switching, by the controller, a mode of the robot cleaner to a normal mode performing an automatic cleaning function or a care mode generating the image information on the management object based on an external input signal.

14. The method of claim 12, wherein the management object is specified and the location information of the management object is obtained based on information, which is stored in a storing unit, capable of identifying the management object.

15. The method of claim 14, further comprising the steps of:
detecting, by the controller, a voice of the management object using a microphone within the robot cleaner;
determining, by the controller, a direction and a distance of a location in which the voice detected by a control unit of the robot cleaner has occurred; and
moving, by the controller, the robot cleaner based on the measured direction and the distance.

16. The method of claim 12, further comprising the steps of:
receiving, by the controller, a guide signal from a following guidance system by a receiver of the robot cleaner;
obtaining, by the controller, the location information of the management object possessing the following guidance system; and
moving, by the controller, the robot cleaner based on the location information.

17. The method of claim 12, further comprising the steps of:
storing, by the controller, the image information in a storing unit of the robot cleaner;
requesting image information of a specific time by the external communication device; and
transmitting, by the controller, the image information of the specific time according to the request of the external communication device.

18. The method of claim 12, further comprising the steps of:
receiving, by the controller, a text message from the external communication device;
converting, by the controller, the text message into audio data; and
outputting, by the controller, the audio data.

19. The method of claim 12, further comprising the steps of:
detecting, by the controller, a voice of the management object;
converting, by the controller, the detected voice into a text message data; and
transmitting, by the controller, the text message data to the external communication device.

20. The method of claim 12, further comprising the step of:
outputting, by the controller, schedule information stored in a storing unit of the robot cleaner, wherein said outputting is by audio.

21. The method of claim 12, further comprising the steps of:
detecting, by the controller, living noises generated around the management object using a microphone of the robot cleaner; and
if a volume of the detected living noises is less than a strength of living essential audio data stored in a storing unit of the robot cleaner, transmitting, by the controller, an abnormal signal to the external communication device.

* * * * *